United States Patent
Bruning et al.

(10) Patent No.: US 6,690,349 B2
(45) Date of Patent: Feb. 10, 2004

(54) SCROLLING BACKLIGHT SYSTEM FOR LCD TV

(75) Inventors: Gert W. Bruning, Sleepy Hollow, NY (US); Subu Muthu, Tarrytown, NY (US); Jeffrey A. Shimizu, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 256 days.

(21) Appl. No.: 10/052,995

(22) Filed: Nov. 9, 2001

(65) Prior Publication Data
US 2003/0090605 A1 May 15, 2003

(51) Int. Cl.$^7$ ................................................. G09G 3/36
(52) U.S. Cl. ............................ 345/102; 349/61; 349/65; 362/31
(58) Field of Search ....................... 345/102; 349/61, 349/65, 64, 67; 362/31

(56) References Cited

U.S. PATENT DOCUMENTS

| | | | | |
|---|---|---|---|---|
| 5,005,108 A | * | 4/1991 | Pristash et al. | ................ 362/31 |
| 5,101,325 A | * | 3/1992 | Davenport et al. | ............ 362/31 |
| 5,226,105 A | * | 7/1993 | Myers | ......................... 385/147 |
| 5,365,413 A | * | 11/1994 | Krammer | ..................... 362/464 |
| 5,515,198 A | | 5/1996 | Kusuda et al. | ............... 359/205 |
| 6,104,371 A | | 8/2000 | Wang et al. | ................. 345/102 |

FOREIGN PATENT DOCUMENTS

| | | | | |
|---|---|---|---|---|
| JP | 06-138458 | | 5/1994 | |
| JP | 11-167808 | | 6/1999 | |
| JP | 11-327750 | | 11/1999 | |
| JP | 200076916 | | 3/2000 | |
| WO | WO9202006 | | 2/1992 | ............. G09F/9/35 |

* cited by examiner

Primary Examiner—Amare Mengistu
Assistant Examiner—Jimmy H. Nguyen

(57) ABSTRACT

Backlighting is provided for an LCD-TV display by directing light from a source into an open end of a cylindrical drum, the other end of which is closed. The drum has a highly reflective inside surface and a beam is directed through an orifice in the cylindrical wall of the drum. A plurality of optical fibers are positioned with one end of each on a circle coaxial with the drum and the other end of each attached along one edge of the panel to which backlighting is provided. The drum, and thus the beam, is rotated about its axis at constant angular velocity, providing light sequentially to each of the fibers with resulting scrolling of the light across the panel behind the LCD array.

4 Claims, 2 Drawing Sheets

SCROLLING BACKLIGHT SYSTEM FOR LCD TV

TECHNICAL FIELD

This invention relates generally to improvements in scrolling backlighting systems of the type used in Liquid Crystal Display Television (LCD-TV) applications for motion artifact reduction and, more particularly, to the invention resides in apparatus for scrolling high intensity light from a source over a backlight panel for an LCD-TV display in a manner which overcomes problems normally associated with scrolling backlight systems.

BACKGROUND TECHNOLOGY

In the transmitting mode of operation of an LCD, light emanating from an appropriate light source is directed to a panel located on the opposite side of the LCD display from the viewer.

In order to reduce motion artifacts in LCD-TV displays, it has been found useful to provide the light in such a manner that a beam is continually scrolled over the panel. Presently, scrolling backlight systems used in the reduction of motion artifacts for LCD-TV use either direct backlit cold cathode fluorescent lamps (CCFLs) or edge-backlit white RGB (red, green, blue) LEDs, the latter of which requires substantially more power than the former. Both systems commonly experience undesirable characteristics such as non-uniformity of illumination over the area of the panel and/or brightness level.

The present invention is directed to overcoming one or more of the problems or disadvantages associated with the relevant technology.

SUMMARY OF THE INVENTION

Light from an appropriate source is directed into the open end of a cylindrical drum, the other end of which is closed. The drum has a highly reflective inside surface and an orifice of predetermined dimensions in the cylindrical wall. The drum is rotated at constant angular velocity about its axis, causing the beam of light passing through the orifice to likewise rotate in a circular pattern. An array of optical fibers is arranged with a proximal end of each fiber positioned on a circle coaxial with the axis of the drum and spaced outwardly from the position on the drum's outer surface which includes the orifice. The distal ends of the fibers are positioned linearly along an edge of the backlighting panel of an LCD array with the distal ends in the same sequence as the proximal ends. Thus, the beam passes through the orifice and sequentially impinges upon the proximal ends of the fibers, and is thereby directed to and scrolled continuously across the panel to provide backlighting with a sufficient and uniform level of brightness.

BEST MODE FOR CARRYING OUT THE INVENTION

Figure 1:
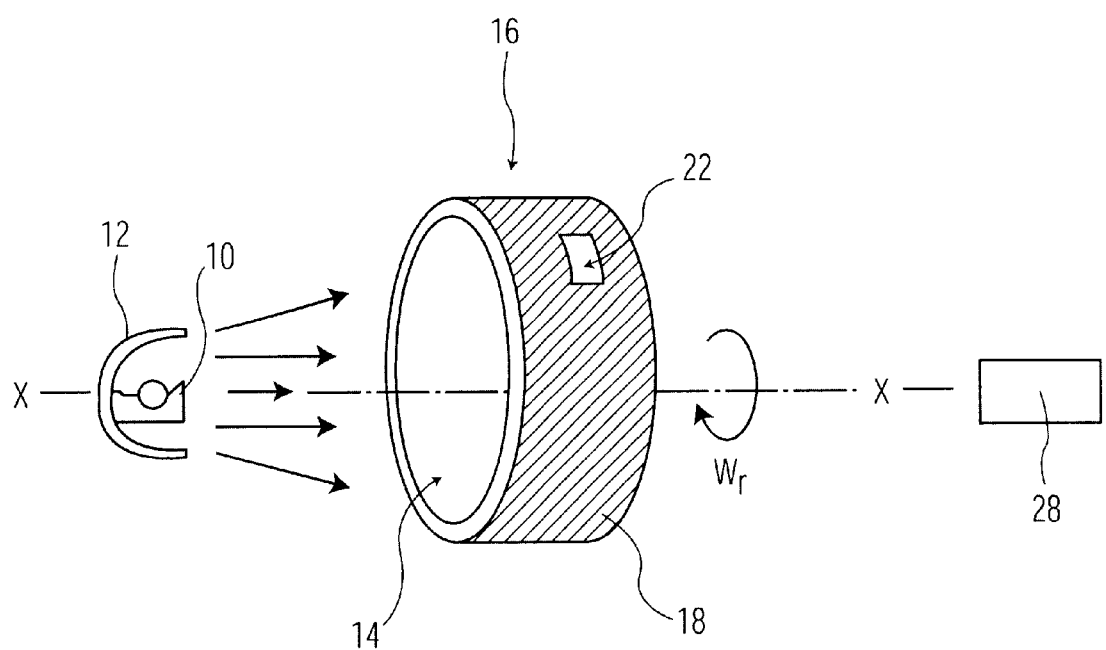
FIG. 1 is a somewhat diagrammatic, perspective view of certain elements of apparatus embodying the invention.
Figure 2:
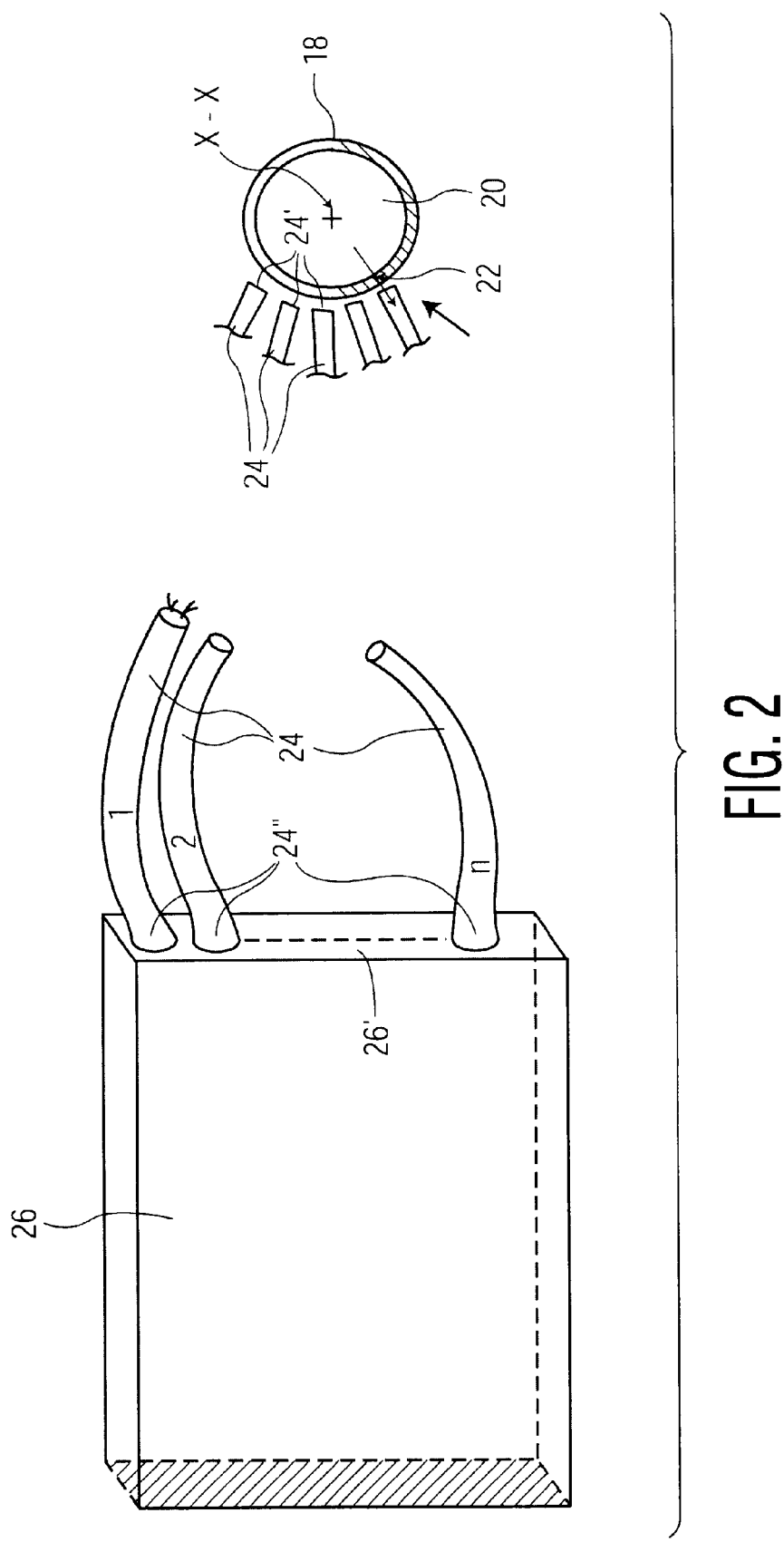
FIG. 2 is a perspective view of portions of the apparatus of FIG. 1, with one element in section, in combination with other elements which form a part of the invention.

Referring now to the drawing, light emitted by high intensity light source 10 is directed by parabolic reflector 12 into open end 14 of drum 16. In projector applications a high intensity discharge lamp, such as a metal halide lamp, is preferred for light source 10, while in other applications a different type of bulb or lamp may be preferable. Cylindrical wall 18 concentrically surrounds drum axis X—X and end wall 20 closes the end opposite open end 14. The internal surfaces of walls 18 and 20 are highly reflective and designed to guide light toward outcoupling orifice 22 in drum wall 18.

A plurality of incoupling fiber optic light guides 24 are positioned with the proximal end 24' of each guide positioned on a circle coaxial with axis X—X, in facing relation and close proximity to wall 18 in the plane of orifice 22. Distal ends 24" of guides 24 are connected to edge 26' of panel 26 in a linear array in the same sequence as proximal ends 24' are positioned about axis X—X. The number of guides 24 is preferably greater than the number of inches in the length of side 26'. For example, sixteen or more guides would be provided for a 15" panel, although this would of course be dependent upon details of panel design and light guide physical parameters.

Functional Description

In operation, rotation is imparted to drum 16, e.g., by motor 28, at a constant angular velocity $\square_r$. Thus, the beam of light passing through orifice 22 is likewise rotated about axis X—X and sequentially scanned over ends 24' of fibers 24. The dimensions of orifice 22 and the positioning of fiber ends 24' are such that the beam is scanned across the full surface of each of the fiber ends, one at a time in the sequence $24_1$–$24_n$ in which the ends are positioned about the drum. The light is conducted by the fibers to and through distal ends 24", which are arranged along edge 26' in the same sequence $24_1$–$24_n$, thereby providing scrolled backlighting to panel 26 with illumination at an acceptable level of uniform brightness.

Other aspects and features of the present invention can be obtained from a study of the drawings, the disclosure, and the appended claims.

What is claimed is:

1. A scrolling backlighting system for a panel carrying an LCD display, said system comprising:
    a) a light source;
    b) a drum having a cylindrical side wall with a central axis, an end wall closing one end of said drum, the other end being open, said side and end walls having highly reflective internal surfaces, and an orifice of predetermined dimensions extending through said side wall;
    c) a reflector positioned to reflect light from said source into said open end of said drum;
    d) a plurality of n optical fibers each having a proximal and a distal end;
    e) said proximal ends being arranged on a circle coaxial with said central axis in outwardly facing relation to said drum in the plane of said orifice in a sequence 1 through n;
    f) said distal ends being arranged linearly along one edge of said panel in said sequence 1 through n; and
    g) motive means for imparting rotation to said drum about said central axis, whereby a beam of light from within said drum passes through said orifice and sequentially impinges on said proximal ends of said fibers for transmission thereby to said proximal ends in said sequence 1 through n and thence to said panel to provide scrolling backlighting illumination for said LCD display.

2. The backlighting system of claim 1 wherein said light source is a high intensity discharge lamp.

3. The backlighting system of claim 1 wherein said motive means rotate said drum at a constant angular velocity.

4. The backlighting system of claim 1 wherein the number of said optical fibers is greater than the number of inches in the length of said one side of said panel.

* * * * *